US010227859B2

(12) United States Patent
Richards et al.

(10) Patent No.: US 10,227,859 B2
(45) Date of Patent: *Mar. 12, 2019

(54) EQUIPMENT MONITORING USING ENHANCED VIDEO

(71) Applicant: Halliburton Energy Services, Inc., Houston, TX (US)

(72) Inventors: William Mark Richards, Flower Mound, TX (US); Scott Wendorf, Dallas, TX (US); Syed Hamid, Dallas, TX (US); Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/129,619

(22) PCT Filed: Apr. 30, 2014

(86) PCT No.: PCT/US2014/036178
§ 371 (c)(1),
(2) Date: Sep. 27, 2016

(87) PCT Pub. No.: WO2015/167532
PCT Pub. Date: Nov. 5, 2015

(65) Prior Publication Data
US 2017/0138171 A1 May 18, 2017

(51) Int. Cl.
*E21B 47/00* (2012.01)
*E21B 41/00* (2006.01)
(Continued)

(52) U.S. Cl.
CPC .......... *E21B 47/0002* (2013.01); *E21B 41/00* (2013.01); *H04N 7/183* (2013.01);
(Continued)

(58) Field of Classification Search
None
See application file for complete search history.

(56) References Cited

U.S. PATENT DOCUMENTS

| 3,714,822 A | 2/1973 | Lutz |
| 5,134,471 A | 7/1992 | Gendron et al. |

(Continued)

FOREIGN PATENT DOCUMENTS

| CA | 2716440 | 5/2007 |
| JP | 2000251059 A | 9/2009 |

(Continued)

OTHER PUBLICATIONS

Lee, J.G., "Lie Detectiion by Remote Video", online news, Jun. 20, 2012, www.zdnet.co.kr/news/news_view.asp?article_id=20120616180336>, 4 pages.

(Continued)

*Primary Examiner* — Michael J Hess
(74) *Attorney, Agent, or Firm* — John Wustenberg; Parker Justiss, P.C.

(57) ABSTRACT

Video of an effect on equipment of an event is received. The event is identified using Eulerian video magnification of the received video.

21 Claims, 9 Drawing Sheets

(51) Int. Cl.
*H04N 7/18* (2006.01)
*G01V 1/00* (2006.01)
*E21B 43/26* (2006.01)
*E21B 47/18* (2012.01)
*E21B 49/08* (2006.01)

(52) U.S. Cl.
CPC .............. *E21B 43/26* (2013.01); *E21B 47/18* (2013.01); *E21B 49/08* (2013.01); *G01V 1/005* (2013.01)

(56) References Cited

U.S. PATENT DOCUMENTS

| | | | |
|---|---|---|---|
| 6,229,453 | B1 | 5/2001 | Gardner et al. |
| 8,138,960 | B2 | 3/2012 | Nonaka et al. |
| 2003/0188862 | A1 | 10/2003 | Streich et al. |
| 2004/0252587 | A1 | 12/2004 | Melese et al. |
| 2009/0110107 | A1* | 4/2009 | Abdallah ............... E21B 47/122 375/295 |
| 2010/0256914 | A1* | 10/2010 | Hutin ..................... E21B 41/00 702/9 |
| 2011/0186353 | A1* | 8/2011 | Turner ................. G05B 13/048 175/40 |
| 2011/0272144 | A1 | 11/2011 | Belcher et al. |
| 2012/0084065 | A1* | 4/2012 | Zhan ................... G06F 17/5009 703/13 |
| 2012/0146805 | A1 | 6/2012 | Vick, Jr. et al. |
| 2013/0076907 | A1 | 3/2013 | Hobbs et al. |
| 2013/0332079 | A1* | 12/2013 | Gudivada ........... E21B 33/0355 702/6 |
| 2014/0072190 | A1* | 3/2014 | Wu ....................... G06T 7/0012 382/128 |

FOREIGN PATENT DOCUMENTS

| | | |
|---|---|---|
| JP | 5134792 B2 | 1/2013 |
| JP | 2013144892 A | 7/2013 |
| WO | 2007136378 A1 | 11/2007 |
| WO | 2010078350 A1 | 7/2010 |
| WO | 2014018003 A1 | 1/2014 |
| WO | 2015167532 A1 | 11/2015 |
| WO | 2015167537 A2 | 11/2015 |

OTHER PUBLICATIONS

Wu, Hao-Yu, et al., "Eulerian Video Magnification for Revealing Subtle Changes in the World," ACM Transactions on Graphics, vol. 31, No. 4, 2012, 8 pages.
NSF International Science & Engineering Visualization Challenge 2012; https://www.youtube.com/watch?v=e9ASH8IBJ2U&feature=youtu.be; Published Nov. 30, 2012.
Eulerian Video Magnification for Revealing Subtle Changes in the World; SIGGRAPH 2012; https://www.youtube.com/watch?v=ONZcjs1Pjmk&feature=youtu.be ; Published May 23, 2012.

* cited by examiner

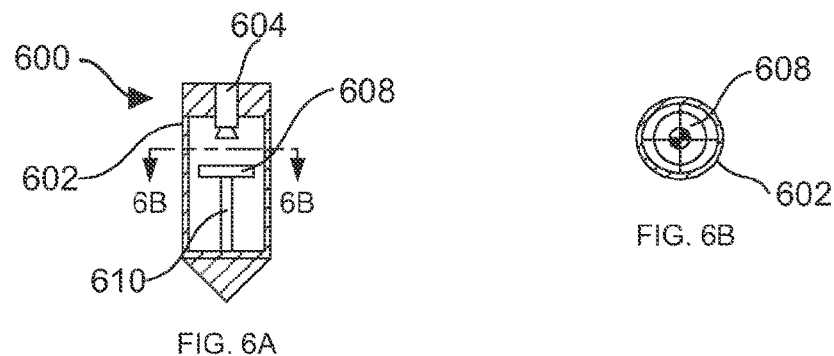
FIG. 6A
FIG. 6B
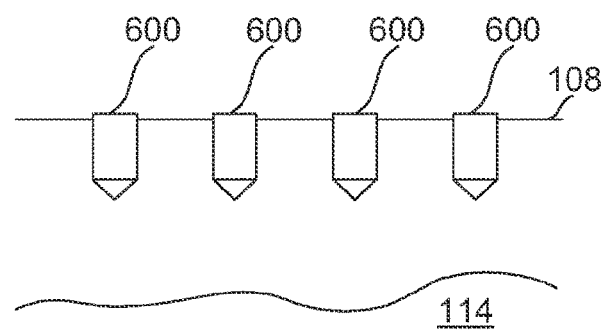
FIG. 6C

EQUIPMENT MONITORING USING ENHANCED VIDEO

CROSS-REFERENCE TO RELATED APPLICATION

This application is the National Stage of, and therefore claims the benefit of, International Application No. PCT/US2014/036178 filed on Apr. 30, 2014, entitled "EQUIPMENT MONITORING USING ENHANCED VIDEO," which was published in English under International Publication Number WO 2015/167532 on Nov. 5, 2015. The above application is commonly assigned with this National Stage application and is incorporated herein by reference in its entirety.

BACKGROUND

The present disclosure relates to monitoring events using enhanced video.

Recognizing, quantifying, and otherwise identifying events at wellsites presents a perpetual challenge. In some instances, the effects of events can be readily perceived, such as by being visible to the naked eye. For example, a major equipment malfunction or other large-scale event in one part of the well system might cause clearly visible vibration (or other movement) of associated equipment or other readily perceived visible effects. Other events—including early stages of well control or equipment malfunction events—might cause only smaller vibrations or other effects that are only minimally detectable, or completely below the threshold of detection, by the unaided naked eye. Sensors, used in a wellbore or at the surface, are conventionally employed to recognize and quantify events by measuring characteristics of the event. However, sensors typically only measure the characteristics only at point locations, and sensors in many existing systems must be placed on or in direct contact with the region or media being sensed. Thus, operators must make do with few sensors and the corresponding limited data produced by the sensors or bear the expense and complexity of placing, communicating with and maintaining a complex sensor network. Moreover, complex sensor networks are often infeasible in remote, inaccessible, and/or underdeveloped locations.

BRIEF DESCRIPTION OF THE DRAWINGS

FIG. 1A shows existing surface features on a terranean surface. FIGS. 1B and 1C show added features to facilitating viewing effects caused by a subterranean event.

FIG. 4A shows a shape feature, FIG. 4B shows a marker on the surface of the tubing and FIG. 4C shows an upstanding marker.

FIG. 6A is a half cross-sectional view of an example camera-based ground monitoring device. FIG. 6B is an end cross-sectional view of the camera-based ground monitoring device of FIG. 6A taken along section line 6B-6B. FIG. 6C is a schematic side view of example camera-based ground monitoring devices deployed a terranean surface for use in seismic monitoring.

Like reference symbols in the various drawings indicate like elements.

DETAILED DESCRIPTION

Figure 1A:
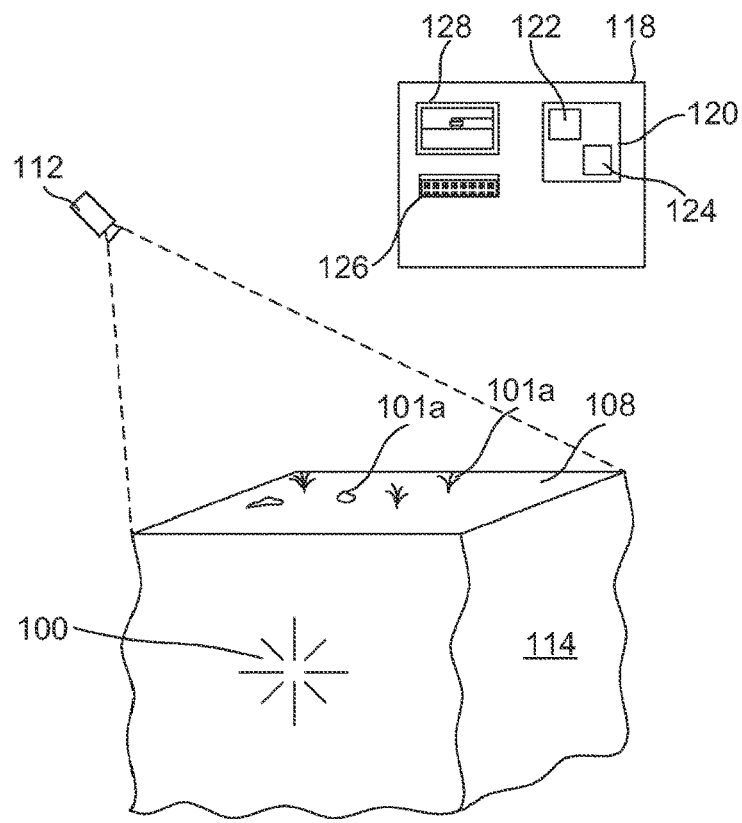
FIGS. 1A-1C are schematics of example sites where a subterranean event is identified using Eulerian video magnification.

The concepts herein relate to monitoring subterranean events using enhanced video.

Video enhancement techniques exist that can magnify the appearance of movement, color changes, sounds, time and other characteristics in video. In general, these techniques involve magnifying or exaggerating one or more characteristics of video, either live or recorded, to make the characteristics more perceptible to a person viewing the video. The techniques can magnify characteristics that are difficult to perceive or not perceptible to a person viewing the characteristics in person or in the unenhanced video, to make them readily perceptible. The techniques can be applied to the entire video or to one or more specific images in the video, such as, a particular surface, object, or other image in the video. One such video enhancement technique is Eulerian video magnification, and, for convenience of discussion, the examples herein will be described with respect to Eulerian video magnification. However, other enhancement techniques are within the concepts herein, and can be used in lieu of Eulerian video magnification or used in combination with Eulerian video magnification.

Eulerian video magnification involves magnifying certain aspects of a video that are difficult to perceive or not perceptible to a person viewing the video to make the aspects more readily perceptible. Eulerian video magnification can be applied to the entire video or to specified subjects (e.g., persons or things) within a video and not to other subjects of the video. For example, Eulerian video can be applied to images of a specified subject to magnify characteristics of the subject and not to other images adjacent the subject or in the background. In doing so, the video is broken down into several layers, including a layer for each subject with characteristics being magnified and a layer for images that are not being magnified. The characteristic or characteristics being magnified are then filtered and exaggerated, and the layers, including those with exaggerated characteristics, are reconstructed into an enhanced video. For example, movement that may be so small that it is difficult to perceive or not perceptible in the unenhanced video is exaggerated in the enhanced video to be movement of greater magnitude that is readily perceptible. In another example, color changes that may be so slight that they are difficult to perceive or not perceptible in the unenhanced video are exaggerated in the enhanced video to be more pronounced color changes that are readily perceptible.

According to the concepts herein video enhancement is applied to video from a well site (including a proposed well site), either received as a recording or as a live feed, to magnify one or more characteristics of the video to make the characteristics more perceptible. The magnification can be applied to make characteristics that are difficult to perceive or not perceptible, either in the video or in person, readily perceptible.

In certain instances, the characteristics being magnified and monitored are characteristics of an event. By way of example, in an instance where the event is a fluid flow and the video includes images of the subject fluid flowing, characteristics including the movement of the fluid, the color of the fluid and/or other characteristics of the fluid itself can be magnified and monitored by Eulerian video magnification. In certain instances, the characteristics represent effects of an event that is remote or blocked (obscured) from the view of the video. Again using the example of fluid flow as the event, the fluid flow may manifest in effects of movement, such as vibration or expansion/contraction, of a tubing containing and obscuring the fluid flow. Thus, Eulerian video magnification can be applied to video including images of the tubing to magnify the tubing's movement. As described in more detail below, the movement of the tubing (i.e., an effect of the flowing fluid) can be monitored to infer characteristics of the fluid. In another example, in an instance where the event is subterranean fluid flow through a subterranean formation, the fluid flow may manifest in effects of movement of the terranean surface in certain locations. Thus, Eulerian video magnification can be applied to video including images of the terranean surface to magnify the movement of the surface. As described in more detail below, the movement of the terranean surface (i.e., an effect of the subterranean flowing fluid) can be monitored to infer characteristics of the fluid and/or the subterranean formation. The examples above are but a few of the possible examples within the concepts herein and many more examples will be described below.

In monitoring the characteristics of an event, the enhanced video can be displayed to a person, and the person using the enhanced video, analyzes the video to see the more perceptible characteristics. In certain instances, the person can use the enhanced video to identify and/or quantify (e.g. measure) the event. Alternately, the video can be analyzed by a computer to identify and/or quantify the event. Some or all of the receipt, enhancement, and analysis can be performed in real time, i.e., without substantial intentionally induced delay, and/or enhancement and/or analysis can be performed with delay. For example, in certain instances, the video is stored and enhanced and/or viewed sometime after the subterranean event has occurred. The enhancement can be performed on video collected using sensors optimized for the human visible light spectrum, or the enhancement can be performed on other types of video, including video collected using sensors optimized for non-visible spectrum (e.g., infrared video, X-ray, magnetic resonance, and/or other). The enhancement can be performed on 3-dimensional and/or stereographic video. Additional specifics and variations will be discussed below in connection with the following examples.

FIG. 1A shows an example site having a system for using Eulerian video magnification to identify a subterranean event 100. The system includes one or more motion video cameras 112 (one shown) to collect video of the site and one or more monitor devices 118 (one shown) to enhance the collected video to magnify one or more characteristics of the video using Eulerian video magnification and/or another technique. In FIG. 1A, the camera 112 is shown aimed to capture video of the terranean surface 108 at the site, but as discussed more below, the camera can alternatively or additionally collect video of other things.

Communication between the camera 112 and the monitor device 118 can be wired communication, wireless communication or a combination thereof. The wired communication can be electrical wire, fiber optic and/or other type of wire, and can be a standalone system or part of one or more local area networks (LANs), wide area networks (WANs), all or a portion of the Internet, and/or any other communication system or systems at one or more locations. Example wireless communication may include 802.11a/b/g/n, 802.20, WiMax, LTE, satellite, and/or any other wireless communications.

The monitor device 118 includes a computing system 120 for receiving video from the cameras 112 and applying video enhancement, such as the Eulerian video magnification mentioned above, to the video. The computing system 120 includes a processor 122, a memory 124, an interface 126 and an output 128 (e.g., display), for allowing a person to interface with the computing system 120 and, in certain instance, allowing a person to view and analyze the video. Although FIG. 1A illustrates a single processor 122, memory 124, interface 126 and output 128, the computing system 120 can be implemented using two or more such systems on the same circuit board or networked together. Indeed, computing system 120 may be any computer or processing device such as, for example, a general-purpose personal computer (PC), Mac (a registered trademark of Apple, Inc.), workstation, UNIX-based workstation, computers other than general purpose computers, a smart phone, tablet or any other device.

Although only one processor 122 is shown, multiple processors can be used. The processor 122 may be a central processing unit (CPU), an application specific integrated circuit (ASIC), a field-programmable gate array (FPGA), or another suitable component. Generally, the processor 122 executes instructions, e.g., software, and manipulates data to perform the operations of the computing system 120.

The memory 124, a non-transitory computer readable media, stores software to operate the computing system 120. The memory 124 can include any type of memory or database module and may take the form of volatile and/or non-volatile memory including, without limitation, magnetic media, optical media, random access memory (RAM), read-only memory (ROM), removable media, or any other local or remote memory component. The memory 124 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto.

The software stored by the memory 124 may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, assembler, Perl, any suitable version of 4GL, as well as others. While portions of the software illustrated in FIG. 1A are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

In operation, the camera 112 is operated to collect video. The collected video is relayed to the monitor device 118. In certain instances the video is relayed to the monitor device 118 in real time. In other instances, the camera 112 stores (i.e., records) the collected video locally, for example, in a memory of the camera 112 or in a nearby memory. The stored video is then relayed from the storage location to the monitor device 118, when or if desired.

The video received at the monitor device 118 is enhanced using the computing system 120. The computing system 120 is operated to apply a video enhancement technique to the video to magnify one or more characteristics of the video. In certain instances, the video enhancement is Eulerian video magnification or Eulerian video magnification combined with another video enhancement technique. The video enhancement can be applied to the entire video or to one or more subjects (i.e., specified images) within the video. For example, applying video enhancement to the image of the terranean surface 108 in the video collected by camera 112, and not to remaining images in the video, facilitates viewing effects of a subterranean event manifest on the terranean surface 108. In another example, applying video enhancement to the images of things at or above the surface 108 (e.g., surface-based equipment) in the video collected by camera 112, and not to remaining images in the video, facilitates viewing effects of an effect manifest on the surface-based equipment. The characteristics enhanced by the video enhancement can be different for different images in the same video, and video enhancement can be applied to enhance more than one characteristic of a given image. In the example of enhancing video of the terranean surface 108, the effects may manifest as movement of the terranean surface 108. Therefore, the enhancement is applied to magnify movement of the terranean surface 108. In the example of enhancing the image of the surface-based equipment collected by camera 112, the effects may manifest as movement (e.g., vibrations, expansion and/or other movement) and temperature changes that affect the color (e.g., infrared light intensity or similar changes in spectral color, brightness) of the surface-based equipment. Therefore, the enhancement can be applied to magnify both movement and color changes of the surface-based equipment. In an example of video having images of multiple different subjects (e.g., both the terranean surface 108 and surface-based equipment), it may be desirable to enhance the video to magnify different aspects of different subjects, e.g., magnifying only movement of one subject, only color of another subject and/or movement and color of yet another subject. Many examples exist and are within the concepts herein. Additional detail and examples are discussed below.

The enhanced video is displayed to a person at the output 128, and the person viewing the output 128 can analyze the enhanced video to determine an occurrence or characteristics of an event. Because the enhancement magnifies characteristics that are not readily visible, i.e. difficult to perceive or not perceptible to a person viewing the unmagnified video, the person viewing the video is able to readily perceive characteristics he or she could not have perceived in person or with video that has not been enhanced. In certain instances, the computing system 120 can analyze the enhanced video to determine an occurrence of an event and output an alert to a person via the output 128, enabling the person to review the enhanced video for further and/or different analysis. The analysis, whether performed by the person alone or using the computing system 120, can take account of other sources of information. In certain instances, the other sources of information include sensors (e.g., pressure, temperature, chemical and/or other types of sensors), flow meters, other current and/or historical data (e.g., data regarding the surface-based equipment, the subterranean zone, and/or other data), information from related processes, and/or other information.

In certain instances, a subsurface event 100 may be an earthquake or a subsurface nuclear or conventional blast for which information is desired for engineering, military, intelligence, or other purposes. The camera 112 may be installed at a vantage point pointed towards the surface 108 adjacent (e.g., above) the subterranean event 100. Movement of the surface 108 caused by the earthquake or by the shock wave of the underground blast, without enhanced video, would be difficult to visually perceive or would be not visually perceptible. However, by applying Eulerian video magnification, the surface movement is more perceptible. Viewing the surface movement can provide information regarding the timing, magnitude, location, and other characteristics of the subterranean event 100.

In certain instances, movement of existing surface features 101a—such as rocks, soil or vegetation—may provide sufficient variation in the image so as allow a subterranean event 100 to be monitored or characterized. Indeed, in certain instances, subterranean events may be monitored where the surface location is remote from the camera, without the necessity of installing sensors or anything else at the surface 108. This may be an advantage where the surface location is in an inaccessible or hazardous area. For example, where the subterranean event 100 is an underground blast, the location on the surface 108 adjacent (e.g., above) the subsurface blast may be unsafe, be in hostile territory, or otherwise inaccessible, but that inaccessible location may be viewable from a more accessible vantage point (such as a nearby ridge, aircraft, drone, or satellite).

Figure 1B:
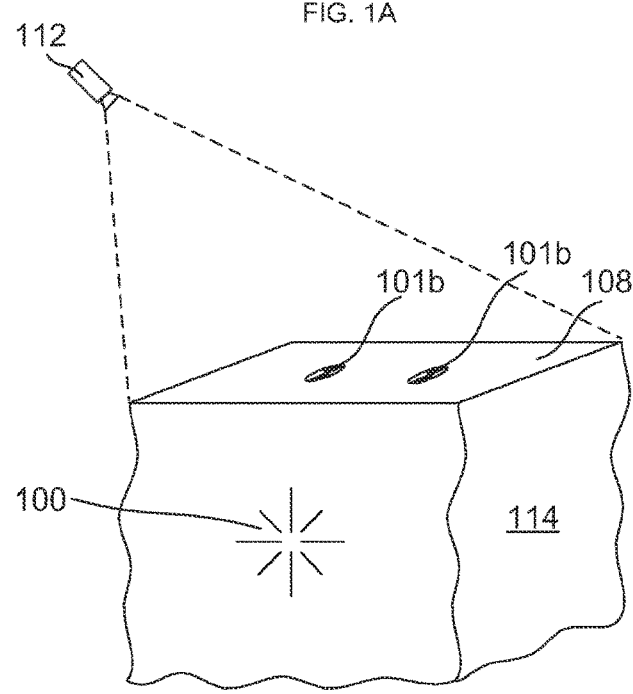
Figure 1C:
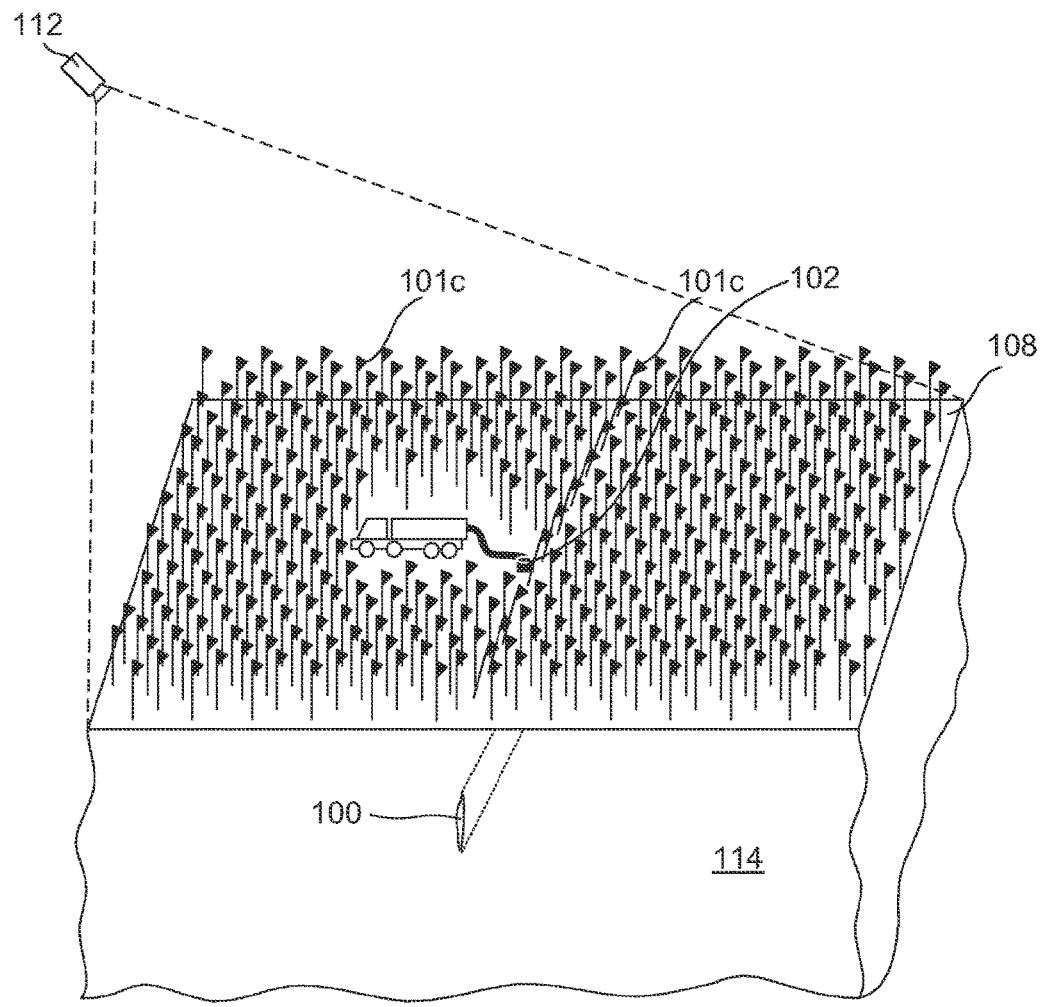

In certain instances, features to facilitate viewing effects caused by a subterranean event 100 can be added to the terranean surface 108. For example, FIG. 1B shows the terranean surface 108 including a surface marker 101b, placed in an area above a subsurface event 100. Like above, the surface marker 101b is shown as a roundel, but other surface markers could be used. FIG. 1C shows the terranean surface 108 including a plurality of upstanding markers 101c, here shown as flags. Like above, other upstanding markers could be used. The markers 101b, 101c can be placed at discrete locations on the terranean surface 108, in a closely spaced array, and/or in another manner. The shape, size, materials, and locations used for the markers can be selected so as to maximize their visible movement in response to a subterranean event 100 and the visibility of that movement to the cameras 112. In the example shown in FIG. 1C, the subterranean event 100 is a subterranean fracture initiated via a fracing well 102, but subterranean event 100 could be any other subterranean event which could cause movement at the surface 108. The flags 101c may quiver or shake slightly in response to the movement, and such quivering or shaking may be more readily detectible.

In the context of exploration and well planning, and for other purposes, cameras 112 and enhanced video can be used in seismic surveying. In seismic surveying, a seismic source device is used to induce seismic signals (e.g., vibrations) into the Earth (including the subterranean zone 114) and the propagation of the subterranean seismic signals through the Earth is interpreted to determine characteristics of the Earth.

The propagation of subterranean seismic signals manifests effects of movement on the terranean surface 108 that, without enhanced video, would be difficult to visually perceive or would be not visually perceptible. Video of the terranean surface 108 from the camera 112 is enhanced to exaggerate the movement of the terranean surface 108 to make the movement readily, visually perceptible. Markers, such as those described above, can be used to facilitate viewing the movement. For example, using a closely spaced array of upstanding markers (e.g., flags) can more clearly show the progression of movement induced by the seismic signal across the terranean surface 108. The enhanced video can be used in lieu of or to supplement surface and subterranean seismic sensors, to measure the magnitude, location, and direction of movement of the subterranean seismic signal through the Earth. This information can then be used to characterize the subterranean zone 114 and other subterranean aspects.

Figure 2:
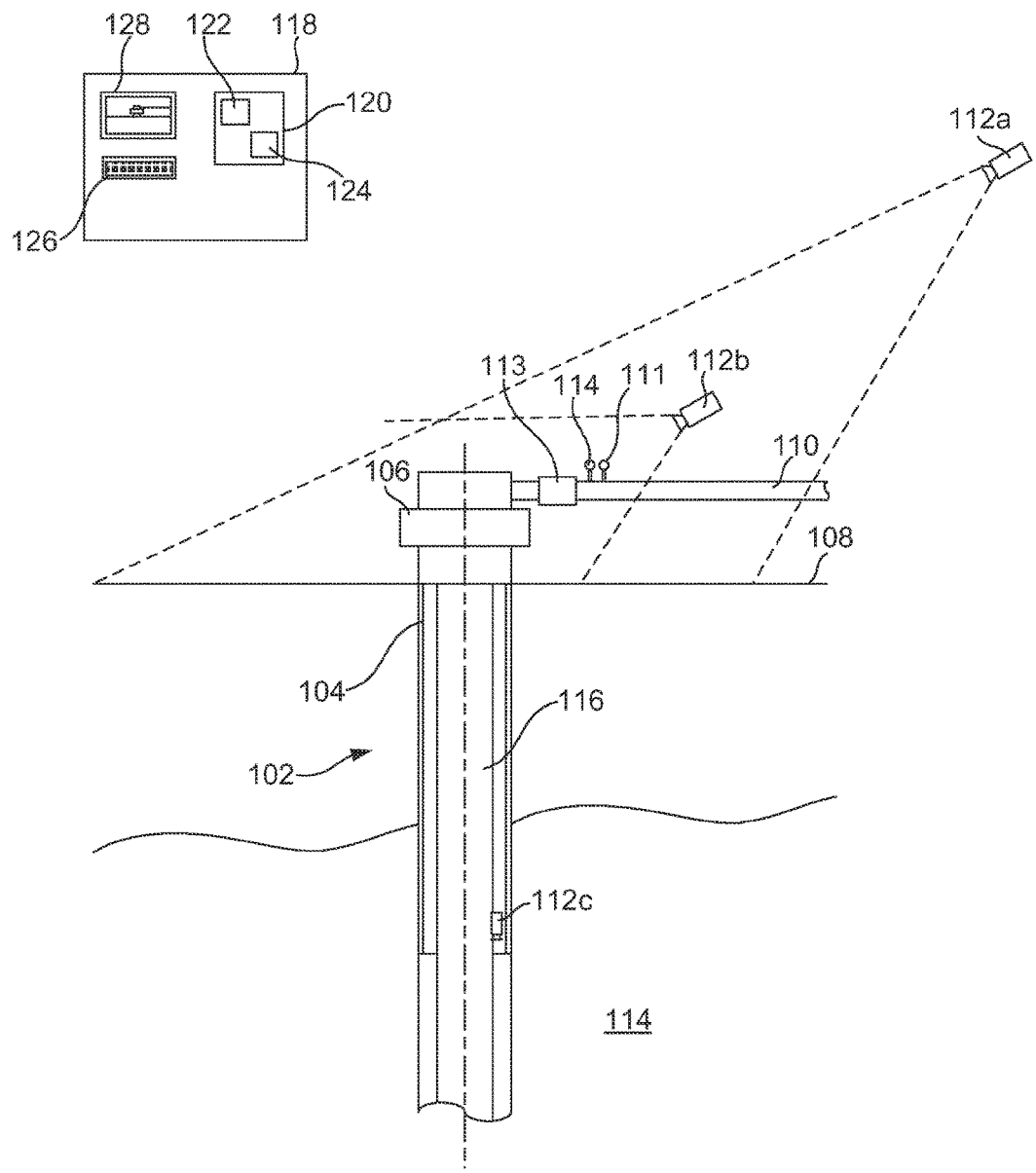
FIG. 2 is a schematic of an example well site in a production/injection context.
Figure 3:
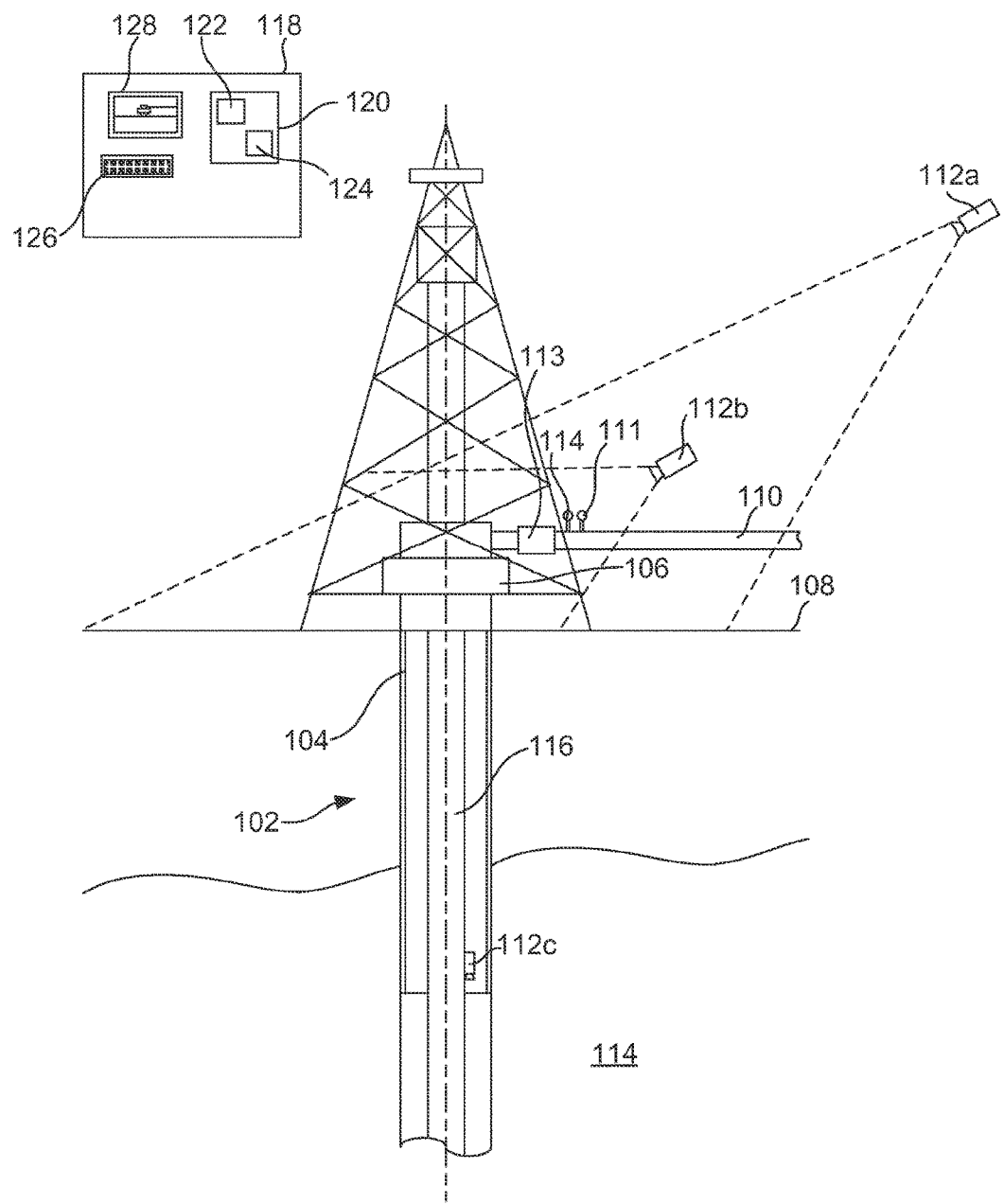
FIG. 3 is a schematic of an example well site in a drilling context.

Referring to FIG. 2, an example well site is shown. The example well site is shown with a well 102, having a wellbore 104 extending into the Earth to one or more subterranean zones 114 (one shown) from a well head 106 at a terranean surface 108. A flow line 110, for injection and/or production, is shown coupled with a string 116 extending into the subterranean zone 114. In the context of production, the string 116 is a production string to transport fluids to the wellhead 106 and the flow line 110 is a production line to transport fluids away from the well 102. In the context of injection, the string 116 is an injection string and the flow line 110 is an injection line for injecting production or treatment fluids (e.g., water in the context of water flood injection, steam in the context of steam injection, fracture fluid in the context of fracture treatment, acid in the context of acidizing, completion fluid in the context of completion, cement in the context of cementing, and/or other fluids). FIG. 3 shows an example well site as the well 102 is being drilled. Thus, instead of a production/injection string 116 extending into the wellbore 104, a drill string 116 is provided. Flow line 110 in this context is a drilling fluid circulation line. In either instance, FIG. 2 or FIG. 3, the well site can include additional equipment, including gauges 111 and other equipment 113. Many different types of equipment 113 can be provided at the well site including pumps, compressors, valves, gauges, sensors, pump systems including pump trucks, engines, blenders, drilling fluid filtration systems, fluid treatment systems, liquid-liquid and liquid-gas separators, well treatment fluid systems including those for fracing, acidizing, completion and/or other treatment, fluid storage and lines, and other equipment used in drilling, producing, injecting or performing a treatment on the well.

In the examples of FIGS. 2 and 3, a video camera 112a is provided above-ground, i.e., outside of the well 102 and not underground, aimed to take video of the terranean surface 108. The camera 112a can take video of the terranean surface 108 around the well 102 (e.g., the drilling pad and a specified distance from the pad), multiple wells and the surface between the wells and/or of another location, including of a terranean surface 108 where one or more wells are proposed but not yet drilled. The video of the terranean surface 108 can encompass anything on the terranean surface 108, including surface equipment and worker activity on the surface 108. The camera 112a can rest on the terranean surface 108 or be supported off the terranean surface 108 at a specified vantage point. The camera 112a may be located away from the well to survey the well site and surrounding land. The camera 112a may be elevated so as to see the ground surface and not just the horizontal plane of the surface. In certain instances, the camera 112a may be mobile carried by a drone or aircraft flying over the well site. The aircraft may be a fixed wing propeller driven, fixed wing jet engine driven, a multi-rotor helicopter drone, or balloon type drone. Also, although shown as a land based well 102, in a subsea well, the camera 112a could be aimed to take video of the sea floor (i.e., the underwater terranean surface 108). In certain instances, the camera 112a may be on a vessel or underwater craft, such as submarine or an underwater remote operated vehicle (i.e., ROV). Another video camera 112b is provided above-ground, outside of the well, aimed to take video of the exterior of surface-based equipment associated with the well 102 and/or well site. In the present example, the video camera 112b is shown aimed to take video of the exterior of the wellhead 106, flow line 110, gauges 111 (e.g., pressure and/or temperature gauges) and other equipment 113 of a land based well 102. In other instances, the camera 112b or another camera could be aimed at other equipment associated with the well 102 or well site, including those discussed above. Additionally, in the context of a subsea well, the camera 112b could be aimed to take video of the exterior of surface-based equipment that are on the sea floor, in the riser to the water surface and/or on the rig, vessel or other location outside of the well 102. The surface based equipment may additionally include one or more transparent windows or openings to allow the camera 112b to view the fluids inside the equipment. Yet another video camera 112c is provided below ground, in the wellbore 104, to take subterranean video. In certain instances, the camera 112c is aimed to take video of aspects in the wellbore 104, outside of a well string 116 or drill string 116, including the exterior of the string 116 itself, the wellbore wall (cased or open hole) and/or fluids or solids in the annulus between the string 116 and wellbore 104. In certain instances, the camera 112c is aimed to take video of aspects in the string 116.

Fewer or more video cameras can be provided. For example, in certain instances, only one or only two of the cameras 112a-c is provided. One or more of the cameras 112a-c and/or additional cameras can be aimed at different subjects than those described above. In certain instances, more than one camera can be provided aimed at the same subject, for example, aimed to provide different views from different perspectives and/or different views of different locations on the subject. In certain instances, one camera can be aimed to take video of multiple subjects. In certain instances, one or more cameras can be aimable, for example, in response to a remote signal or moved by a person, to enable the camera's aim to change. For example, aimable cameras enable taking video of one subject for a period of time, then taking video of a different subject. In some examples, one or more cameras can be carried or worn by a user, rather than stationary. In certain instances, one or more of the cameras 112a-c can be isolated from ground movement, for example, supported on a fluid mount and/or in another manner.

The video cameras 112a-c are in communication with a monitor device 118 at the well site or remote from the well site. The monitor device 118 can be dedicated to the one well site, receiving video from only the one well site, or the monitor device 118 can receive video from multiple well sites. In certain instances, the monitor device 118 is in a building or mobile vehicle or trailer. In certain instances, the monitor device 118 is carried or worn by a user.

Figure 4A:
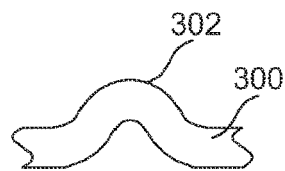
FIGS. 4A-C are schematics of a tubing having example features to make movement of the tubing more apparent.

In certain instances, the surface-based equipment can include features to facilitate viewing events and effects caused by an event. Although described with respect to tubing, any of the surface-based equipment can include these features. For example, FIG. 4 shows a tubing 300, such as flow line 110 or another tubing associated with the well, having a shape feature 302 of specified characteristics selected to make movement in the tubing 300 more apparent. Here the shape feature 302 is shown as a U-shaped bend in the tubing, but in other instances the feature 302 could be a loop, curve or other shape, and the shape feature could be applied to other surfaced-based equipment than tubing. In certain instances, the shape feature 302 could be a whistle, Helmholtz resonator, and/or other device adapted to vibrate or produce an acoustic signal in response to fluid flow. US Patent Publication 2012/0146805, entitled "Systems and Methods for Well Monitoring," published Jun. 14, 2012, discloses a number of suitable devices. Additionally, the concepts herein could be used in concert with a system as described in this publication. In certain instances, the shape feature 302 can be tuned to produce a specified response in response to the event or effect being monitored. For example, the shape feature 302 can be tuned to move in a specified manner as fluid is passed through it, expand in a specified manner in response to temperature, and/or produce another specified response.

Figure 4B:
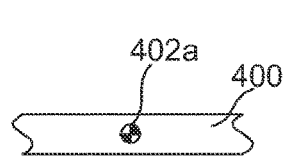
Figure 4C:
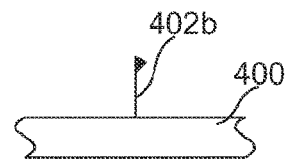

FIG. 4B shows a tubing 400 having a surface marker 402a that, in this instance, is a roundel applied to the exterior of the tubing 400. Other surface markers 402a, such as dots, X-shapes, and/or others could be used. FIG. 4C shows tubing 400 with an upstanding marker 402b that is an upstanding flag extending outward from the tubing 400. Other upstanding markers 402b, such as upstanding panels, blades, cantilevered beam, pendulum and/or other markers could be used. In certain instances, the upstanding markers 402b are sensitive to movement so that they amplify or exaggerate movement, e.g., having a flexible shaft. Also, although only one marker 402a, 402b is shown in each instance above, two or more markers (of the same or different type) could be used. In certain instances, the surface-based equipment can additionally or alternatively be supplied with high visibility, bright color coatings (e.g., paint, stickers and/or other), reflective coatings, strain and/or temperature sensitive coatings that change color in response to strain or temperature to make strain or temperature change more apparent, and/or other types of coatings.

In addition to, or as an alternative to, using cameras like camera 112 in the seismic surveying, camera-based ground monitoring devices can be used. FIGS. 6A-6C show an example ground monitoring device 600, having an external housing 602 containing a camera 604 aimed at a target 608. The target 608 is supported on a movement sensitive base 610, such as an elevated table, pendulum or other mechanical device that is sensitive to, and in certain instances magnifies, movement. The target 608 can take many forms. FIG. 6B shows a roundel. In certain instances, the target 608 is a ball in a fluid (e.g., oil and/or other fluid) filled chamber. The interior of the housing 602 may be illuminated by a light (e.g. light emitting diode) to illuminate the target 608. In use, the camera-based ground monitoring devices 600 are placed at least partially in the ground at various locations along the terranean surface 108, for example, in a grid, specified pattern and/or another arrangement. The devices 600 are linked to communicate with the monitor (e.g. monitor device 118) via a wired or wireless communication. Movement at the terranean surface 108 by the seismic signal causes the target 608 to move and the camera 604 views the movement. The image of the moving target 608 is then enhanced to exaggerate the movement, making movement readily perceptible that, without enhanced video, would be difficult to perceive or not perceptible. As above, the camera-based ground monitoring devices 600 can be used alone, together with the surface 108 cameras described above, and/or surface and subterranean seismic sensors to measure the magnitude and progression of the subterranean seismic signal through the earth. This information can then be used to characterize the subterranean zone 114 and other subterranean aspects.

In the context of drilling, cameras, including camera 112b, and enhanced video may be used to monitor for effects of a drilling related event manifest as movement (e.g., vibration and/or expansion/contraction) of the drill string 116, the blow out preventor 106, the mud returns line (e.g., flow line 110) and/or other equipment 113 that would otherwise be difficult to perceive or not perceptible. For example, a subterranean gas kick encountered by the drilling will cause an increased pressure in the drill string 116, the wellhead 106, the mud returns line 110 and/or other equipment 113. The increased pressure will produce an effect such as certain movements that, especially in the early stages of the kick, are difficult to perceive or not perceptible. In many instances, once the effects of the gas kick are readily perceptible without enhanced video, it is too late to react. With enhanced video, the movement manifest by the gas kick is readily perceptible; and therefore, can be monitored to identify and quantify the magnitude of coming gas kicks, and in certain instances, identify coming gas kicks in the early stages of the kick with time to react. Certain movement signatures of one or more concurrent or sequenced movements can be empirically or otherwise determined and associated with the movement of the drill string 116, the wellhead 106, the mud returns line 110 and/or other equipment 113 caused by gas kicks. In addition to relying on the judgment of a person viewing the enhanced video, identifying the presence or sequence of these movement signatures from the enhanced video can be used to identify and quantify the gas kicks.

Increased bit whirl due to changes in the rock of the subterranean zone 114, drilling bit wear, or potential sticking of the drill bit or drill string will manifest effects on the drilling string 116 at the surface. The effects can include certain movement or changes in movement of the drilling string 116 that is difficult to perceive or not perceptible. With enhanced video, the movement is readily perceptible; and therefore, can be monitored to identify and quantify these drilling problems. As above, movement signatures can be determined for these events and used in identifying and quantifying the events.

Fluid pulse telemetry (a.k.a. mud pulse telemetry) signals sent from within the wellbore 104, for example, by in-well telemetry devices and carried in the mud cause the pressure of the drilling mud (i.e., fluid) to change. The pressure changes of the pulses manifest effects on the drilling string 116, the blow out preventor 106, the mud returns line 110 and/or other equipment 113 at the surface. The effects can include movement in equipment that is difficult to perceive or not perceptible. For example, in certain instances, the pressure pulses manifest as traveling waves of diametric enlargement of cylindrical flow conduits. The pressure pulses, themselves, are not perceptible without direct connection of pressure or flow monitors on the flow lines. Although the use of such sensors is common practice, in certain instances, it is desirable to minimize the number of connections into or on the flow lines. In addition, in certain instances, it is desirable to monitor the pressure pulses at a plurality of locations in order to carry out array processing of the signals so as to improve the signal to noise ratio. With enhanced video, the movement manifest by the pressure pulses of the fluid pulse telemetry signals are readily perceptible; and therefore, can be monitored to identify and decode the fluid pulse telemetry signals. For example, by observing the movement of the surface equipment caused by the pressure changes of the pulses, the duration, timing and magnitude of the pressure pulses can be determined and movement signatures for the telemetry signals can be determined and used to identify and decode the telemetry signals. The duration, timing and/or magnitude derived from the enhanced video can be digitized and decoded much in the same way that information from a pressure sensor would be decoded to provide the underlying communication. Moreover, noise in the signals, such as caused by reflections and other vibratory sources, will be more apparent and more readily filtered.

Figure 5A:
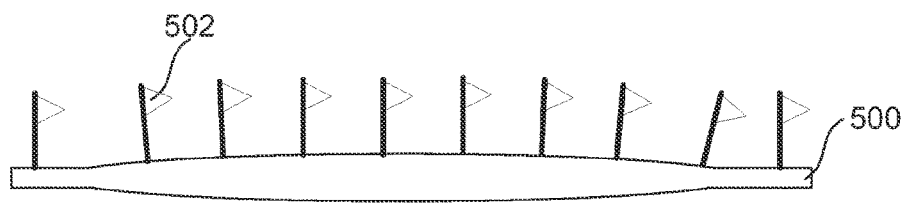
FIG. 5A is a schematic of a tubing having features to make movement of the tubing more apparent.

FIG. 5A shows a section of cylindrical tubing 500, part of the plumbing at the Earth's surface used to convey drilling fluid to a mud pipe. This section of tubing 500 has markers 502 attached to it. The markers 502 are shown as flags, but could be another type of marker. As the diameter of the tubing 500 expands and contracts due to changes in and propagation of the pressure pulses, the markers 502 change location, and in certain instances, orientation. Movement of the markers 502 can therefore be used to track the passage of pressure pulses through the pipe. Each marker 502 essentially serves as an indicator of pressure at the point at which the marker is applied.

In certain instances, for length considerations, multiple, spaced-apart sections of markers 502 can be used and monitored to facilitate identifying wave propagation. Stated differently, it is not necessary for the markers 502 to be applied continuously along all of the surface tubing 500. Each of the markers 502 are a form of pressure transducer. Applying the markers 502 to flexible hoses can facilitate identifying wave propagation, because the wave speed in such hoses is on the order of one tenth of the wave speed in normal pipe. An example of such a hose (which will be called a "flex hose" hereafter) is a Kelly hose, which is connected between the standpipe of a rig and the swivel. The wave speed in normal pipe is about 4,300 feet/second, depending on the pipe inner diameter, thickness and Young's modulus, and depending on the compressibility of the drilling mud. In normal pipe, a 100 ms fluid pulse will span 430 feet, while in a flex hose, it will span on the order of 43 feet. A 30 Hz carrier wave in normal pipe will have a wavelength of about 143 feet, while it is expected to be on the order of 14 feet in a flex hose.

Figure 5B:
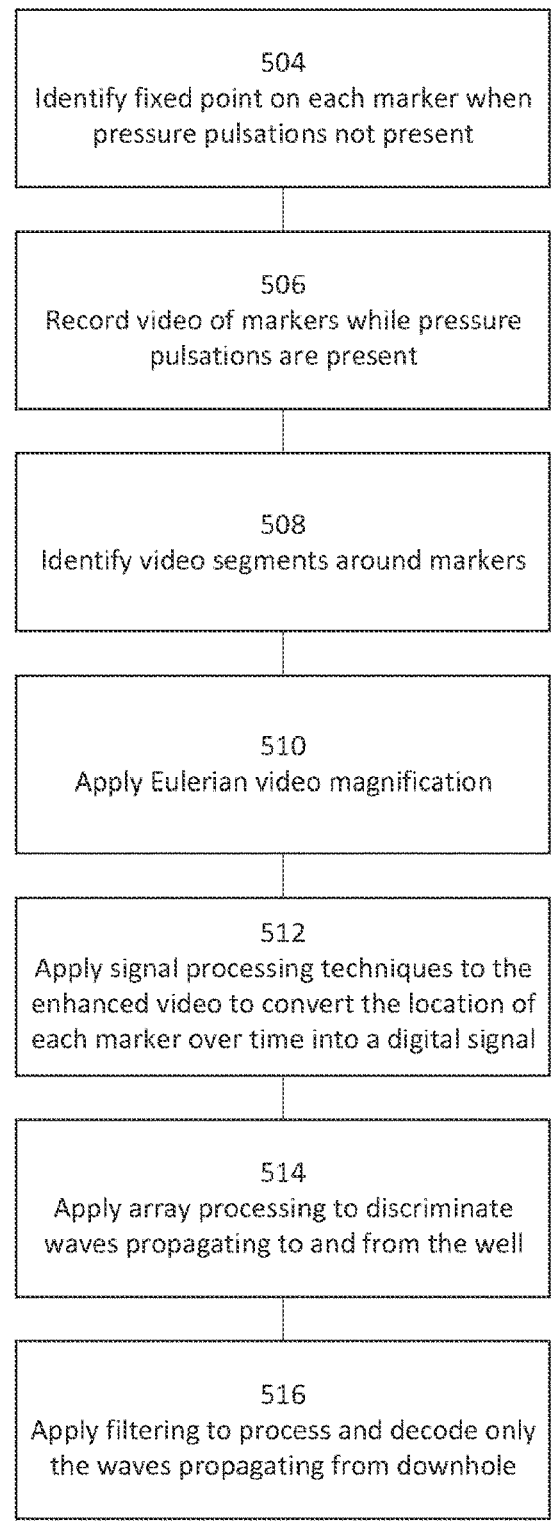
FIG. 5B is a flow chart of example operations to decode fluid pulse telemetry.

An example procedure for processing a video so as to extract fluid pulse telemetry signals is shown in FIG. 5B. At operation 504, signal processing begins by first identifying a fixed point on each of the markers at a time when no pressure fluctuations are present in the flow lines. It should be noted that it is not strictly necessary to use markers attached to the surface of the equipment, as suitable reference points on the equipment can be selected by reviewing a representative Eulerian video. At operation 506, when pressure fluctuations are present and it is desired to detect fluid pressure pulse signals, video is recorded. The video can be streamed to a digital signal processor or computer. At operation 508, under automatic control by a signal processor or computer, portions around the markers are selected for further processing. In certain instances, if there are m markers, these will be used to produce m video streams (sub videos). At operation 510, the sub videos are enhanced using Eulerian video magnification, identifying the marker positions over time. At operation 512, conventional or hereinafter developed signal processing techniques are used to identify the location of each marker of the m sub videos over time. In certain instances, the marker locations can be analyzed once per frame, although other time scales can be used. These are then converted into m data streams. For example, the displacement of a marker from its reference position (i.e. the position the marker was recorded to be at when there was no pulsations present) can serve as a signal value. At operation 514, the m data streams are then processed using standard or hereinafter developed digital signal processing techniques to separate waves propagating from downhole in the well from waves that are propagating to downhole and produce a signal component that dominantly contains waves propagating from downhole. Note that the more markers are tracked, the larger the number of reflections can be removed from the signals. At operation 516, the signal that dominantly contains waves propagating from downhole is then processed as though it was a standard fluid pulse telemetry signal.

In the context of fluid monitoring and/or control, for drilling, treatment, production, injection, and/or other purposes at the well site, cameras, including the camera 112b, and enhanced video can be used to monitor for effects of a fluid event manifest in movement (e.g., vibration and/or expansion/contraction) of surface-based equipment, including the production/injection string, the wellhead 106, the flow line 110, and/or other equipment 113 that would otherwise be difficult to perceive or not perceptible. For example, fluid flow through the surface-based equipment will cause movement of the equipment that is difficult to perceive or not perceptible. Further, different fluid properties, such as density, solids content, gas content, pressure, temperature will cause different movement of the equipment. With enhanced video, the movement manifest by the fluid is readily perceptible; and therefore, can be monitored to identify the presence of fluid flow and flow rates. Additionally, fluid properties can be identified from the movement, including fluid density, solids content, gas content, fluid pressure and temperature. As above, movement signatures can be used to identify and quantify these events. In certain instances, the gas/liquid ratios (e.g., gas to oil ratios), water content, the type of multi-phase flow and other characteristics of the fluid can be determined with the enhanced video. As above, movement signatures for these fluid characteristics can be determined and used to identify and quantify these characteristics.

As above, fluid pulse telemetry from within the wellbore 104, for example, by in-well telemetry devices and carried in the well fluids can be monitored to identify and decode the telemetry signals using the enhanced video. Also or alternatively, acoustic telemetry, for example, communications encoded as acoustic vibrations in the material of equipment, can be monitored to identify and decode the telemetry signals using enhanced video in a process similar to that of FIG. 5B. The acoustic vibrations manifest as movement in equipment that is difficult to perceive or not perceptible. With enhanced video, the movement manifest by the vibration of the acoustic telemetry signals are readily perceptible; and therefore, can be monitored to identify and decode the acoustic telemetry signals.

In certain instances the cameras, including the camera 112b, can be a thermal imaging camera and/or used with a thermal imaging camera and the thermal video enhanced to monitor effects of temperature of the fluids (drilling, production, injection and/or other fluids) on the surface-based equipment. Temperature responsive coatings could alternatively or additionally be used with a camera operating in the visual spectrum in identifying temperature changes. Such monitoring can identify temperature changes of the fluids that would be difficult to perceive or not perceptible with unenhanced thermal video. Additionally, different characteristics of fluid flowing through the surface-based equipment, such as fluid flow rates, composition, gas/water/oil content, multiphase flow, the formation of hydrates, and other characteristics, will manifest in different temperatures. As with the movement signatures, temperature signatures for different fluid characteristics can be determined and used to identify and quantify the characteristics. For example, monitoring temperature could facilitate monitoring for gas flow, water cut, multiphase flow or other dynamic changes to the flow.

In certain instances cameras, including the camera 112b, can be aimed to view and enhanced video can be used to monitor gauges 111 outside of the well, including pressure, temperature and/or other types of gauges. In certain instances, the gauge needles may move very slowly or the movement may be very slight and, as a result of either, may be difficult to perceive or not perceptible. With enhanced video, these movements would be readily perceptible; and therefore, can be monitored to identify changes in the characteristics monitored by the gauges 111.

In the context of monitoring the surface-based equipment itself, cameras, including the camera 112b, and enhanced video may be used to monitor for effects of events manifest as movement of the well string 116, the wellhead 106, the flow line 100/110 and/or other equipment that would be otherwise difficult to perceive or not perceptible. For example, a blockage in the internal flow passages through the surface-based equipment will cause an increased pressure in the fluid flow, manifest as movement (e.g. expansion) of the well string 116, the wellhead 106, the flow line 110 and/or other equipment that is difficult to perceive or not perceptible. In certain instances, blockages may also cause temperature differences on the equipment that, even with thermal video, are difficult to perceive or not perceptible. The blockage could be caused by debris buildup, hydrate formation (especially in subsea equipment) slugs of different density fluid, and/or other causes. With enhanced video (visible spectrum and/or thermal imaging), the movement and/or temperature effects manifest by the blockage are readily perceptible; and therefore, it can be monitored to identify the occurrence of the blockage, identify the location in the surface-based equipment of the blockage, and quantify the degree of the blockage. As above, movement signatures can be determined for these events and used to identify and quantify the blockage.

Flow through damaged or deficient portions of the surface-based equipment will manifest effects on the well string 116, the wellhead 106, the flow line 110 and/or other equipment 113 that would be otherwise difficult to perceive or not perceptible.

For example, a pressure containing portion of the surface-based equipment, if corroded, will be thinned and expand to a greater degree than a portion that has not been corroded. Loose connections, cracks, metallurgical deficiencies and other damaged or deficient portions of the surface-based equipment will manifest in movement. With enhanced video, the movement manifest by flow through the damaged portion of the surface-based equipment is readily perceptible; and therefore can be monitored to identify damage, identify the location of the damage, and quantify the degree of the damage. As above, movement signatures can be determined for these events and used to identify and quantify the damage.

As noted above, in certain instances the surface-based equipment 113 includes pumps. The pumps can be used for many operations, including pumping treatment fluids (e.g., fracking fluids, acidizing fluids, completion fluids and/or other), pumping injection fluids (e.g., water, brine, $CO_2$, $N_2$ and/or other), gas lift, drilling, pumping production fluids and/or for other purposes. Operation of the pump, including its drive and any transmission, will manifest effects on the exterior surface of the pump and/or in other equipment coupled to the pump, such as the well string 116, the wellhead 106, the flow line 110 and/or other equipment 113, for example, in the form of movement. The movement may be difficult to perceive or not perceptible or, if perceptible, difficult to visually quantify. For example, different operating speeds or operating loads of the pump, cavitation or vapor lock will produce different movement. Wear, erosion or damage to internal components in the pump, including wear of seals and bearings, and to the engines or motors driving the pump will cause yet different movement. With enhanced video, the movement manifest by operation, wear, erosion and damage is readily perceptible; and therefore can be monitored to identify and quantify operation, wear, erosion and damage of the pump. In certain instances, the wear, erosion or damage will manifest effects before the wear, erosion or damage substantially affects the operation of the pump, and thus enhanced video can facilitate identifying and quantifying wear or damage before it causes a service interruption. As above, movement signatures can be determined for different operating conditions of the pump (e.g., speed and load) and for different forms of wear and damage to the pump and used to identify and quantify the operation and health of the pump. In one example, the concepts can be applied to monitoring a fracturing pump fluid end and drive, e.g., the internal combustion engine and transmission driving the fluid end. In another example, the concepts can be applied to $CO_2$ or $N_2$ pumps and their drivers. Many other examples exist and are within the concepts herein.

In the context of fracture treating the subterranean zone, cameras, including camera 112a, and enhanced video can be used in fracture mapping. In fracture treating a subterranean zone, fracture fluid is pumped into the wellbore and into the subterranean zone at high pressure and high volumes to cause the subterranean zone to expand and fracture. The resulting fractures emanate outward from the wellbore into the subterranean zone, and subsequently operate to communicate fluids between the subterranean zone and the wellbore. The propagation of the fractures manifest effects of movement on the terranean surface 108 that, without enhanced video, would be difficult to visually perceive or would not be visually perceptible. Video of the terranean surface 108 from the camera 112 is enhanced to exaggerate movement of the terranean surface 108 to make the movement readily, visually perceptible. As with seismic surveying, markers, such as those described above can be used to facilitate viewing the movement. By mapping the magnitude, location and direction of the movement at the terranean surface 108, as the fractures are being formed, an indication of the size (i.e., dimensions), location, and direction of propagation of the subterranean fractures can be determined. Moreover, the size and location of the completed fractures can be mapped, and in certain instances, mapped concurrently with the formation of the fractures. As above, movement signatures can be determined to identify the effects of fractures at the surface, and used to identify and quantify the fractures.

The same concepts can be applied in mapping other types of injection treatments. For example, in some types of injection treatments, fluids (gas/liquid) are pumped into the subterranean zone through one or more injection wells to treat the subterranean resources and/or the formations of the zone to enhance production. In certain instances, such as steam injection, the injection fluids can enhance production by improving the flow of the reservoir fluids through the subterranean zone. In certain instances, such as water flood, the injection fluids can enhance production by sweeping or driving the reservoir fluids toward production wells. There are many other types of injection treatments relevant to the concepts herein. The propagation of the injection fluids through the subterranean zone can manifest effects of movement on the terranean surface 108 that, without enhanced video, would be difficult to visually perceive or would not be visually perceptible. Video of the terranean surface 108 from the camera 112 is enhanced to exaggerate movement of the terranean surface 108 to make the movement readily, visually perceptible. As above, markers can be used to facilitate viewing the movement. By mapping the magnitude, location and direction of the movement at the terranean surface 108, an indication of the amount, location, and direction of propagation of the subterranean fluids can be determined. Moreover, this information can be mapped, and in certain instances, mapped concurrently with the injection treatment. As above, movement signatures can be determined to identify the effects of injection treatments at the surface, and used to identify and quantify the injection treatment.

Figure 7A:
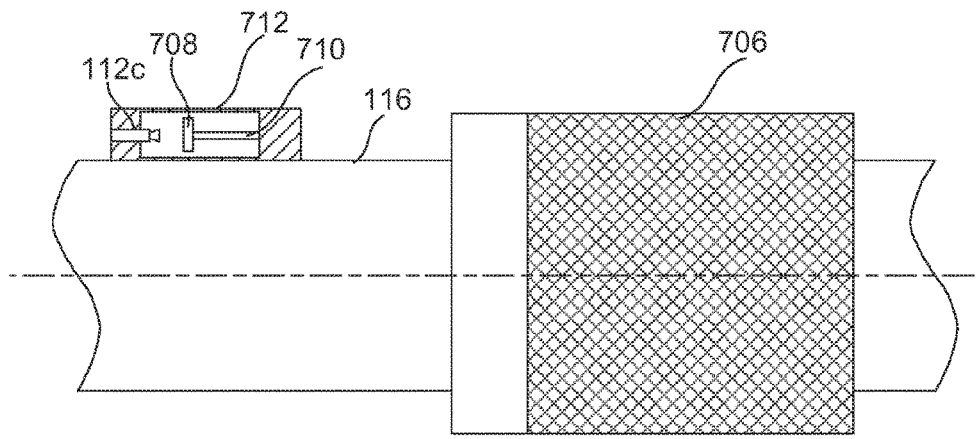
FIG. 7A is a partial view of an example well string in a completion for production/injection.
Figure 7B:
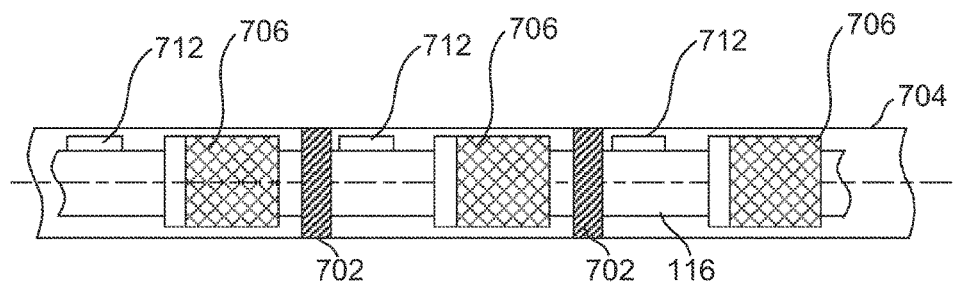
FIG. 7B is a detail view of the well string of FIG. 7A.

In the context of monitoring subterranean events from in the well 102, cameras, including camera 112c, and enhanced video can be used. FIGS. 7A and 7B show the well string 116 configured as a multi-zone gravel packed completion, having a plurality of packers 702 that seal with the wall of the wellbore 704 to define multiple production zones. The completion is gravel packed in that gravel slurry has been introduced into the annulus around the exterior of the string 116, and acts to provide support to the wellbore 704 and as an initial filter against particulate. The well string 116 includes one or more well screens 706 in each zone that act as a further filter against particulate. Some or all of the zones have a camera 112c mounted to the string 116 in an arrangement similar to that of FIG. 6A, having a target 708 on a movement sensitive base 710, encased in a downhole type housing 712. The housing 712 is shown as offset (i.e., outside the diameter of the base tubing of the string), but in other instances, the housing 712 could be at gauge (i.e., at the same diameter as the base tubing). Movement due to fluid flow and changes to the reservoir such as reservoir compaction and fracture of the reservoir will cause the target 708 to move, and the camera 112c and enhanced video can be used to monitor movement to determine flow rate, fluid properties (e.g., gas/liquid ratios, water content and others), solid content in the fluid, seismic signals representing reservoir compaction, flow channeling through the gravel pack, whether the well screens 706 are blocked, erosion or damage to the well screen, restricted or flowing, identify alpha and beta waves of the gravel, and/or other information on a zone by zone basis. Movement due to operation of tools in the well string 116 will also cause the target 708 to move, and the camera 112c and enhanced video can be used to monitor movement to determine when and whether tools in the well string have operated. For example, operating packers, tools passing indicating collars in casing, and opening and closing valves and shifting side sleeves will cause the target 708 to move, as well as cause changes in flow that cause the target 708 to move. In certain instances the camera 112c can be a thermal imaging camera and/or used with a thermal imaging camera, and the thermal video enhanced to monitor effects of temperature of the fluids in the wellbore. Such monitoring can identify temperature changes of the fluids in the wellbore and in the subterranean zone that would be difficult to perceive or not perceptible with unenhanced thermal video. Temperature responsive coatings could alternatively or additionally be used with the camera 112c in identifying temperature changes. As above, monitoring temperature could facilitate monitoring for gas flow water cut multiphase flow or other dynamic changes to the flow. As above, movement signatures can be determined to identify and quantify these different events.

Figure 8A:
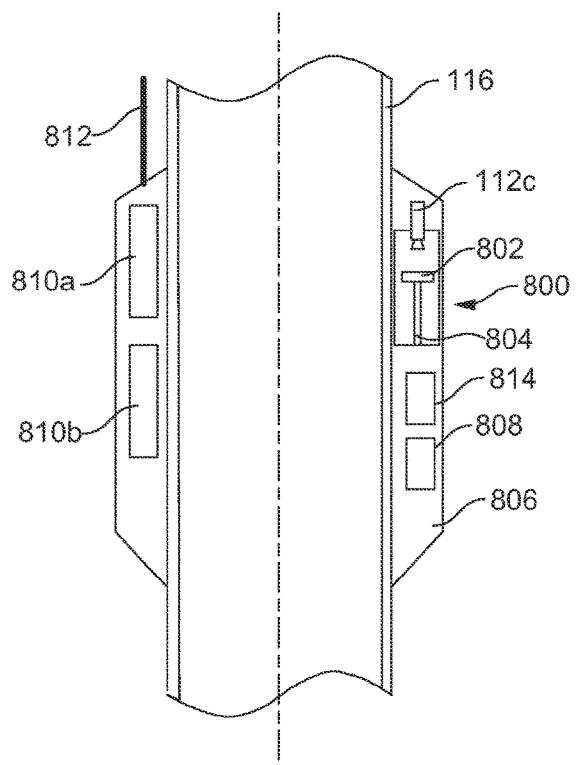
FIG. 8A is a half cross-sectional view of an example camera based in-well monitoring tool for connection into a well string.
Figure 8B:
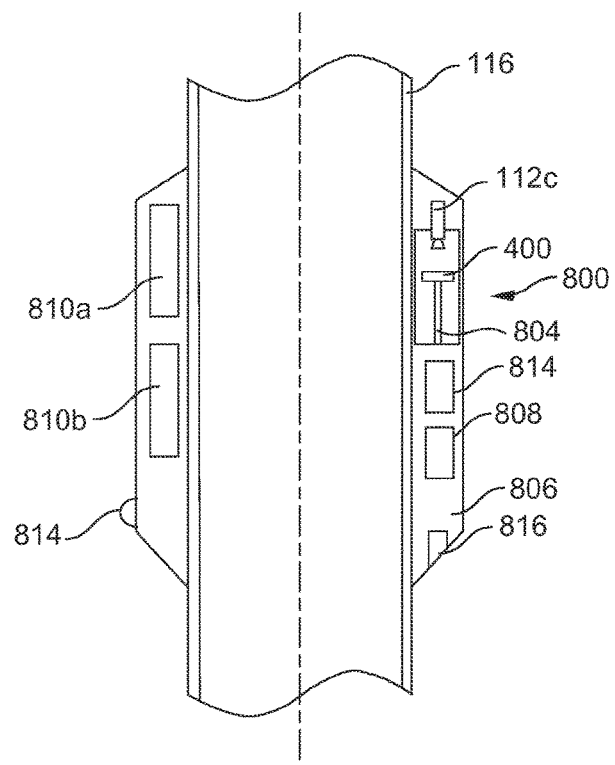
FIG. 8B is a half cross-sectional view of an example camera based out-of-well monitoring tool for connection into a well string.

FIGS. 8A and 8B show a half cross-sectional view of other examples of the camera 112c mounted in the string 116 in an arrangement similar to that of FIG. 7A. As above, the subassembly 800 has a target 802 on a vibration sensitive base 804 encased in a housing 806. The housing 806 is shown as offset, but in other instances, the housing 806 could be at gauge. The subassembly 800 can be coupled (threadingly and/or otherwise) in-line with other tubing and devices of the string 116 as needed, for example, at one or more specified locations in the string 116 where monitoring with enhanced video is desired. In certain instances, the subassembly 800 can be configured to reside and operate in the well 102 (e.g., having a downhole type housing 806). In certain instances, the subassembly 800 can be configured to reside and operate outside of the well 102, for example, placed at the top of the string 116 near the rig floor. The subassembly 800 can include a controller 808 for operating the camera 112a, storing video, and/or other functions. The subassembly 800 also includes a battery 808 for powering the camera 112a and controller 808.

In certain instances, the subassembly 800 can incorporate one or more additional components. For example, the subassembly 800 can include one or more of a sensor or sensor array 810a for sensing aspects inside the center bore of the string 116, a sensor or sensor array 810b for sensing aspects outside of the subassembly 800 (e.g., in the wellbore) and other components. In certain instances, the sensors 810a, 810b and other components can include sensors for pressure, temperature, fluid properties, accelerometers, magnetometers, acoustic emitter/sensors (e.g., hydrophones, geophones), gamma emitter/sensors, and/or sensors for other aspects. In certain instances, the subassembly 800 can be a logging while drilling (LWD) tool or measurement while drilling (MWD) tool. By incorporating sensors with the camera 112a, the subassembly 800 can make measurements in multiple domains, concurrently. Also, the subassembly 800 can make measurements in redundancy to the enhanced video from camera 112a. For example, in addition to monitoring the movement of the string 116 with the camera 112a and enhanced video, the movement of the string 116 can be monitored with hydrophones and/or accelerometers used as sensors 810a, 810b. The enhanced video and output from the sensors 810a, 810b can be compared to identify and eliminate noise.

In FIG. 8A, the subassembly 800 is shown with a communication line 812 for communication to a remote location, e.g., through the well 102 to a monitor device 118 at the outside of the well 102. In certain instances, the communication line 812 is an electrical line, a fiber optic and/or another type of communication line 812. In other instances, the subassembly 800 can communicate on a well telemetry system, e.g., to a monitor device 118 outside of the well 102. In FIG. 8B, the subassembly 800 is shown with an output 814, such as a light, display, acoustic transducer (e.g., speaker) and/or other output for displaying status and other information to a person viewing the exterior of the subassembly 800. The subassembly 800 of FIG. 8B additional has a data link port 816 for communication with the subassembly 800' while outside of the well 102. In other instances, the subassembly 800 can communicate wirelessly.

In certain instances, the concepts herein can be applied in concert with an acoustic monitoring system as described in US Patent Publication 2012/0146805, entitled "Systems and Methods for Well Monitoring," published Jun. 14, 2012, to provide holistic well site monitoring. For example, both enhanced video and acoustic indications could be used to identify events and their effects. In certain instances, the system could include artificial intelligence to allow for quicker reaction or to enhance predictive value from the combined enhanced video and acoustic monitoring.

Although described in connection with monitoring aspects of a well, the concepts can be applied in other contexts, including refineries, production processing plants, pipeline gas compression stations, pipeline pump stations and/or other contexts. Many examples exist and are within the concepts herein.

In view of the above, certain aspects encompass receiving video of an effect of an event on equipment at a well site. The event is identified using Eulerian video magnification of the received video.

Certain aspects encompass a system with a camera aimed to take video of an event on equipment at a well site. The system includes a computing device in communication with the camera. The computing device is configured to receive the video and apply Eulerian video magnification to the received video to produce enhanced video. The system also includes a display to output the enhanced video.

Certain aspects encompass a method where video of equipment at a well site is received. Eulerian video magnification is applied to the received video to produce an enhanced video. An event that is obscured from view of the video is identified using the enhanced video.

The aspects above can include some, none, or all of the following features. In certain instances, the equipment is subterranean. Identifying the event can encompass identifying and decoding fluid pulse telemetry signals carried in fluid from a well of the well site. In certain instances, the event is obscured from view of the video. Identifying the event can encompass identifying fluid properties of a fluid in surface equipment; the fluid obscured from view of the video. Identifying the event can encompass identifying damage or wear to the equipment; the damage or wear obscured from view of the video, or a fluid blockage in the equipment that is obscured from view of the video. In certain instances, the equipment is a subterranean well screen. In certain instances, identifying the event encompasses identifying operation of a subterranean well tool. In certain instances, receiving video includes receiving video of an effect of an event on drilling equipment at the well site, and identifying the invention encompasses identifying a bit whirl, bit wear, or sticking of the drill bit. In certain instances, receiving video comprises receiving video of an effect of an event on a surface pump at the well site, and identifying the event comprises identifying operating speed, cavitation, vapor lock, wear or damage. In certain instances, receiving video encompasses receiving video of one of a surface marker on a surface of the equipment or an upstanding marker supported to move with the equipment.

A number of embodiments have been described. Nevertheless, it will be understood that various modifications may be made. Accordingly, other embodiments are within the scope of the following claims.

We claim:

1. A method, comprising:
   receiving video of an effect of an event on well site equipment, the received video comprising one of a surface marker on a surface of the equipment or an upstanding marker supported to move with the equipment; and
   identifying the event using Eulerian video magnification of the received video.

2. The method of claim 1, where the event is obscured from view of the video.

3. The method of claim 1, where the equipment is subterranean.

4. The method of claim 1, where identifying the event comprises identifying and decoding communications.

5. The method of claim 4, where the communications comprise fluid pulse telemetry signals from fluid from a well or acoustic telemetry signals carried as vibrations of the well site equipment.

6. The method of claim 1, where identifying the event comprises identifying a fluid property of a fluid in surface equipment, the fluid obscured from view of the video.

7. The method of claim 6, where the fluid property comprises flow rate.

8. The method of claim 1, where identifying the event comprises identifying damage obscured from view of the video or wear obscured from view of the video.

9. The method of claim 1, where identifying the event comprises identifying a blockage in a flow passage of the equipment, the blockage obscured from view of the video.

10. The method of claim 8, where the equipment comprises a subterranean well screen.

11. The method of claim 1, where identifying the event comprises identifying operation of a subterranean well tool.

12. The method of claim 1, where receiving video comprises receiving video of an effect of an event on a surface pump at the well site; and
    where identifying the event comprises identifying operating speed, cavitation, vapor lock, wear or damage.

13. The method of claim 12, where the pump is a frac pump or a gas injection pump.

14. A system, comprising:
    a camera aimed to take video of an event on equipment at a well site; and
    a computing device in communication with the camera to receive the video and apply Eulerian video magnification to the received video to produce enhanced video, the received video comprising one of a surface marker on a surface of the equipment or an upstanding marker supported to move with the equipment; and
    a display to output the enhanced video.

15. The system of claim 14, where the equipment comprises, in view of the camera, one or more of a flag, the marker or a color change coating that changes color in response to strain or temperature.

16. The system of claim 14, where the camera is aimed to take video of drilling equipment or pumps at the well site.

17. The system of claim 14, where the equipment comprises a housing at least partially underground and containing the camera and a target supported on a movement sensitive base, the target being in the view of the camera.

18. The system of claim 14, where the camera comprises a thermal camera.

19. A method, comprising:
- receiving video of equipment at a well site, the received video comprising one of a surface marker on a surface of the equipment or an upstanding marker supported to move with the equipment;
- applying Eulerian video magnification to the received video to produce an enhanced video; and
- identifying an event that is obscured from view of the video using the enhanced video.

20. The method of claim 19, where applying Eulerian video magnification comprises applying Eulerian video magnification to magnify movement or color of a terranean surface or equipment associated with a well.

21. The method of claim 19, where receiving video of equipment at a well site comprises receiving video of an effect produced by the event.

* * * * *